US006593957B1

(12) United States Patent
Christie

(10) Patent No.: US 6,593,957 B1
(45) Date of Patent: Jul. 15, 2003

(54) MULTIPLE-VIEWER AUTO-STEREOSCOPIC DISPLAY SYSTEMS

(75) Inventor: Paul Christie, Newport News, VA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/146,007

(22) Filed: Sep. 2, 1998

(51) Int. Cl.[7] .......................... H04N 9/47; H04N 73/04; H04N 15/00; G02B 27/22
(52) U.S. Cl. ...................................................... 348/42
(58) Field of Search ........................ 348/42, 51, 52, 348/53, 54, 55, 57, 58, 59; 359/462, 463, 464, 465, 466, 467, 477; 345/31–33, 9; 342/176, 180; H04N 9/47, 13/04, 15/00; G02B 27/22

(56) References Cited

U.S. PATENT DOCUMENTS

| | | | | |
|---|---|---|---|---|
| 5,349,379 A | * | 9/1994 | Eichenlaub | 348/59 |
| 5,392,140 A | * | 2/1995 | Ezra et al. | 359/41 |
| 5,410,345 A | * | 4/1995 | Eichenlaub | 348/59 |
| 5,606,455 A | * | 2/1997 | Eichenlaub | 359/463 |
| 5,777,720 A | * | 7/1998 | Shapiro et al. | 351/237 |
| 5,835,166 A | * | 11/1998 | Hall et al. | 349/15 |
| 5,917,562 A | * | 6/1999 | Woodgate et al. | 349/15 |
| 5,936,774 A | * | 8/1999 | Street | 359/630 |
| 5,973,844 A | * | 10/1999 | Burger | 359/622 |
| 6,081,377 A | * | 6/2000 | Tomita | 359/495 |
| 6,111,598 A | * | 8/2000 | Faris | 348/57 |
| 6,184,969 B1 | * | 2/2001 | Ferganson | 348/196 |
| 6,259,561 B1 | * | 7/2001 | George et al. | 359/566 |

* cited by examiner

Primary Examiner—Chris Kelley
Assistant Examiner—Tung Vo
(74) Attorney, Agent, or Firm—Testa, Hurwitz & Thibeault, LLP

(57) ABSTRACT

Autostereoscopic image displays provide highly realistic three-dimensional images to one or a plurality of viewers without the need for wearable appliances. In some embodiments, the images are viewed through a beamsplitter, while in other embodiments the viewer observes the images on a display screen. A viewer-tracking system monitors the viewer's movements and directs each image of a stereopair to the proper eye of the viewer. In some embodiments, the stereoimages are kept independent and separately directed through differential polarization. In other embodiments, this is accomplished through selective intensity modulation.

35 Claims, 8 Drawing Sheets

MULTIPLE-VIEWER AUTO-STEREOSCOPIC DISPLAY SYSTEMS

FIELD OF THE INVENTION

The present invention relates to creation and viewing of three-dimensional moving or still images, and in particular to "autostereoscopic" systems that do not require special wearable peripheral devices.

BACKGROUND OF THE INVENTION

For well over a century, researchers have proposed and developed a variety of devices that allow viewing of images or graphic designs in three dimensions. The concept of true "stereoscopic" viewing holds tremendous potential for applications ranging from entertainment to scientific visualization and basic research. Stereoscopically portrayed stories and events carry the impact and immediacy of true realism, allowing viewers to be drawn into an experience with the sense that they are truly there.

Efforts to date have largely been confined to specific, controlled environments. For example, for decades moviegoers have donned special glasses to view stereoscopic films; for this application, the restricted presentation atmosphere and a captive audience willing to tolerate special viewing aids facilitated use of relatively unsophisticated optical arrangements. Similar audience receptivity underlies the current generation of commercial "virtual reality" devices, which require the user to wear full-vision headgear that imparts an "immersive" three-dimensional environment.

Displays involving eyeglasses or headgear control what enters the eyes rather than what exits the display. The wearable apparatus covering the user's eyes allows separate information to be provided to each eye. The left-eye and right-eye images differ in perspective but not content, so the viewer integrates the images into a single, stereoscopic picture. Early three-dimensional film systems displayed left-eye and right-eye images in separate colors, which were directed to the appropriate eye by special glasses having lenses tinted with one or the other of these colors. More recent adaptations of this approach code the left-eye and right-eye images with orthogonal polarizations, and utilize eyeglasses with orthogonally oriented polarizers.

The disadvantages to systems that require eyeglasses or wearable headgear are numerous and well-known. Beyond the inconvenience and unnaturalness of wearing an appliance, the user may also experience headaches or eye strain. Head-mounted displays suffer the additional disadvantage of being single-user devices, isolating viewers from one another and preventing them from sharing the three-dimensional experience with others.

Another popular form of stereoscopic display relies on lenticular optical technology, which utilizes a linear array of narrow cylindrical lenses to create separate spatial viewing zones for each eye. Image information for the different view zones is spatially separated in the back focal plane of the cylindrical lenslets, allowing the lenslets to direct this information only to a narrow area of the viewing plane. Recent adaptations of this approach utilize liquid crystal display (LCD) panels or LCD-projected images to provide an updatable display medium for creating the spatially separated information behind the cylindrical lenses. Lenticular displays also suffer from certain drawbacks, however, such as poor image resolution (due both to the need to divide the overall resolution of the single image-producing device over a plurality of view zones, and to diffraction). Lenticular designs are also difficult to adapt to multi-user environments.

Other approaches to stereoscopic image presentation include so-called "volumetric" displays (which utilize a medium to fill or scan through a three-dimensional space, small volumes of which are individually addressed and illuminated), and electronic holography displays. Both of these types of display require rapid processing of enormous quantities of data, even for lower resolution images, and both have significant obstacles to overcome when the displays are scaled up to accommodate larger image sizes. In addition, the volumetric displays produce transparent images which, while suitable for applications (such as air-traffic control or scientific visualization) where the illusion of solidity is less important than a wide viewing zone, do not typically provide a fully convincing experience of three-dimensionality.

Macro-optic display systems utilize large-scale optics and mirrors, as opposed to lenticular displays, to deliver each image of a stereopair to a different viewing zone. A system designed by Hattori et al. (see Hattori et al., "Stereoscopic Liquid Crystal Display," *Proc. Telecom. Advance. Org.* (TAO) 1st Int'l. Symp. (1993)) utilizes two LCDs, one providing left-eye information and the other providing right-eye information. The outputs of both LCDs are combined by a beamsplitter, with the light passing through each LCD being focused to a separate viewing zone. The Hattori et al. system utilizes a monochrome cathode-ray tube (CRT) monitor behind each LCD as the illuminating light source. Each monochrome monitor is driven by a To camera that records the viewing area in front of the display, capturing a picture of the viewer. A pair of infrared (IR) illuminators, each emitting at a different wavelength, are angled toward the viewer from different sides. Each recording camera is equipped with a bandpass filter tuned to the emitting frequency of one or the other IR illuminator. Because the illuminators each face the viewer at an angle, one of the cameras records an image of the left side of the viewer's face, while the other records an image of the right side. A fresnel lens near each LCD projects the left-side or right-side image of the viewer's face, as appropriate, onto the corresponding side of the viewer's actual face. As a result, the image information from each LCD reaches only the appropriate left or right eye; for example, because light passing through the left-eye image LCD goes only to the left side of the viewer's face, the viewer's left eye sees only left-eye information. As the viewer moves within the viewing space, the image on the monitors moves with him, so the view zones for the left-eye and right-eye images remain properly positioned over the viewer's left and right eyes.

This type of display offers a number of advantages over prior designs. It is "autostereoscopic," so that the user receives a three-dimensional image without special wearable peripheral devices. It is capable of delivering three-dimensional images to a moving viewer anywhere within the viewing area, and can accommodate several viewers at once. In addition, because the system uses LCDs as the primary image source for the stereopairs, it is capable of generating strongly realistic, full-color images of naturalistic scenes (as well as displaying ordinary two-dimensional television or other information). And since only two LCDs are used, the total amount of information needed to drive the display is only twice that of a standard television or monitor.

The Hattori et al. design poses problems in terms of scalability, however. Because the viewer-tracking system is implemented with CRTs, larger displays will require proportionally larger CRTs and more powerful lenses. As a result, the display size, cost, and complexity expand dramatically with increase in the size of the stereoscopic image. Moreover, because this design requires a final beamsplitter to be placed between the display medium and the viewer, the resulting three-dimensional images give the psychological impression of being inaccessible to the viewer; this arises from the fact that stereoscopic images display the least distortion when the three-dimensional content is localized at or near the surface of the display medium, which is positioned behind the final beamsplitter. Other limitations of the design stem from shortcomings that generally affect CRT displays, such as varying image intensities.

Another macro-optical design was recently proposed by Ezra et al. (see Ezra et al., "New Autostereoscopic Display System," SPIE Proc. #2409 (1995)). Starting once again with two image LCDs combined by a beamsplitter, an additional system of fold mirrors and another beamsplitter were added to allow both LCDs to be backlit by a single light source. A lens disposed near each LCD images the single light source to the eyes of the viewer. These lenses are laterally offset by a do slight amount from the optical axis of the LCDs so that two separate images of the light source are created in the viewing area. Light passing through the left-eye LCD forms an image of the light source near the viewer's left eye, while light passing through the right-eye LCD forms an image of the light source near the viewer's right eye. By moving the light source behind the two LCDs, the left-eye and right-eye view zones can be moved to follow a viewer within the viewing area. To accommodate additional viewers, additional "dynamic light sources" can be added so as to create further view zones. More recently, this group proposed handling multiple viewers with a single, specialized illumination component rather than multiple individual light sources. This specialized component consists of a number of thin, vertical cold-cathode sources arranged in a one-dimensional array. See Woodgate et al., "Observer Tracking Autostereoscopic 3D Display Systems," SPIE Proc. #3012A (1997).

This system shares many of the advantages of the Hattori et al. design described above, and overcomes the difficulties stemming from multiple illumination sources. Once again, however, the ability to scale the Ezra et al. system can be problematic. The two LCDs and the beamsplitter occupy a large space for a display of only modest three-dimensional size. As in the Hattori et al. system, the three-dimensional image is "trapped" behind the output beamsplitter, making the images seem inaccessible. Finally, the array of cold-cathode sources have a limited on/off switching speed, creating possible lags in tracking speed.

DESCRIPTION OF THE INVENTION

Brief Summary of the Invention

The present invention addresses the foregoing limitations using a variety of innovative approaches to viewer tracking and image presentation. Although the various embodiments of the invention are well-suited to presentation of complementary stereoimages to each of the viewer's eyes, it should be stressed that the invention is not limited to this use. More broadly, the invention is useful in any context requiring the directing of separate images to distinct spatial regions. For example, the images generated by the invention can be directed to different viewers (rather than the left and right eyes of a single viewer), so that viewers observing the same display device can view different images. Although the ensuing discussion is directed toward generation of stereoimages for a single viewer, it should be understood that this is for convenience of presentation only.

In a first embodiment, an improved "through-the-beamsplitter" approach (in which the viewer sees a stereoscopic image through a final beamsplitter located at the output of the display) utilizes light polarization to separate left-eye and right-eye stereoimages. Each of the complementary images is projected so as to be visible to only one of the viewer's eyes. This may be accomplished by means of a viewer-locating system that acquires the locations of the viewer's eyes, and a viewer-tracking system that directs each stereoimage to the proper location.

In accordance with this embodiment, a viewer-locating means acquires a facial image fragment of the viewer; as used herein, the term "facial image fragment" refers to a recognizable portion of the user's face, and may include, or be limited to, a first one of the viewer's eyes. For example, a camera at the front of the display may capture a picture of the viewer with one side of his face illuminated by an IR source. The system further comprises means for generating a tracking output image, the output image comprising a first region of light polarized in a first polarization direction and substantially conforming to the facial image fragment, and a second region of light polarized in a second polarization direction orthogonal to the first polarization direction. Two displays produce complementary stereoimages, and the tracking output image is directed through each of the displays so as to illuminate them in accordance with the polarizations of the tracking output image. The facial image fragment is focused onto a corresponding portion of the viewer's face through the first display. Each of a pair of polarizers is interposed between the tracking output image and each of the displays; one of the polarizers is oriented in the first polarization direction and the other in the second polarization direction. This arrangement presents illumination from the appropriate display to the first eye of the viewer and illumination from the other display to the viewer's other eye. Naturally, as with all embodiments of the invention, the stereoimages may represent a single, still stereopair or may instead change rapidly over time to convey movement.

In a second embodiment of the invention, polarization is used to segregate stereoscopic images for presentation on a display screen. In accordance with this embodiment, the stereoimages are combined through a projection lens onto a rear-projection display that directs each image component to the proper eye of the viewer.

In accordance with the second embodiment, a tracking system acquires a facial image fragment of the viewer, the facial image fragment including a first one of the viewer's eyes. First and second complementary stereoimages are polarized in first and second polarization directions, respectively, and then combined (e.g., by a beamsplitter) into a composite image. A projection lens system projects the composite image onto a viewable display. Before the projected composite image reaches the display, however, it passes through means for separating the first and second images from the projected composite image. The image projection and/or display are controlled such that the viewer's first eye receives light only from the first stereoimage and the viewer's other eye receives light only from the second stereoimage.

In a preferred implementation of this embodiment, the means for separating the first and second images generates a tracking polarization pattern. This pattern has a first region substantially correlated to the facial image fragment (i.e., having the same general contour as the facial image fragment, although at a different scale) and a second region separate from the first region (e.g., the remainder of the pattern), and the pattern operates to alter the polarization state of the composite image. In particular, the pattern rotates the first or second region to a first polarization direction but rotates the other region to a second polarization direction. The altered light then passes through an output polarizer (disposed between the tracking polarization pattern and the display) that passes only that portion of the pattern-modified composite image polarized in the first or second direction. Which direction the polarizer passes depends on the polarizations initially applied to the two stereoimages, as discussed below.

The image exiting the polarizer reaches the display, which may be, for example, a lens functioning as a projection screen. The lens is situated so as to direct that portion of the composite image which has passed through the first region of the pattern onto the region of the viewer's face from which the first region was derived. Suppose, for example, that the facial image fragment is drawn from the left side of the viewer's face, the first region of the pattern (which is defined by this fragment) rotates the polarization of the incoming light by 90°, and that the output polarizer is oriented vertically. Assuming the left stereoimage is initially polarized horizontally, the viewer's left eye will receive only light originating with the left stereoimage. This is because light directed toward the viewer's left eye has been rotated 90° by the first region of the pattern; the horizontally polarized light from the left stereoimage now passes through the vertical output polarizer, while the light from the right stereoimage, which was polarized vertically but has now been rotated 90°, is absorbed by the output polarizer. The opposite effect occurs with respect to the remainder of the composite image, which is directed toward the viewer's right eye. Since this light is unrotated, only the vertical component—originating with the right stereoimage—can pass through the output polarizer. As a result, the proper image is continuously directed toward the proper eye of the viewer.

A third embodiment of the invention provides a projection system that is polarization-independent. In accordance with this embodiment, two LCDs are used as "light valves" to restrict the output of separate projection subsystems, each of which projects one image of a stereopair onto a beamsplitter that combines the images. The combined images are viewed through a display such as a projection screen (as in the second embodiment). Each LCD passes a small region of light corresponding to a viewing zone. The size and position of each region, combined with the geometry and optics of the display, operate to ensure that each of the viewer's eyes receives light only from the proper stereoimage. It should be stressed that, as used herein, the term "light valve" connotes either variable illumination restriction or generation. For example, in the restrictive case described above, a source of illumination is positioned behind the light valve, which allows the light to pass only through a defined region. In the variable-illumination case, the light valve itself generates the desired region of illumination.

In a fourth embodiment, a single image source presents left-eye and right-eye images in rapid succession, and a light valve, in cooperation with the image source, synchronously presents the alternating images to the proper eye of the viewer (whose position is tracked). So long as the device performs this cycle of alternating images and light-valve regions at a high enough frequency, the viewer will see a proper three-dimensional image through the single image display.

One implementation of this embodiment includes an image source that successively displays left and right stereoimages, a light valve for providing a controllably sized and positioned region of light, and a focusing system for passing light from the light valve through the image source so as to present an image. Based on the tracked position of a viewer, a controller actuates the light valve so as to alternately define, in synchrony with display by the image source of left and right stereoimages, a pair of light regions comprising a left-eye region through which an image from the image source will appear in a left view zone visible to the viewer's left eye, and a right-eye region through which an image from the image source will appear in a right view zone visible to the viewer's right eye.

In a second implementation, the image appears on a projection screen or similar display device. In accordance with this implementation, light from the image source is directed through a projection lens onto the display screen, which may itself be a lens or lens system. The light valve is disposed between the image source and the display screen, at or near the projection means, which directs toward the left view zone light provided by the left-eye region of the light valve and directs toward the right view zone light provided by the right-eye region.

The invention also embodies methods relating to the above-described systems and various components thereof.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
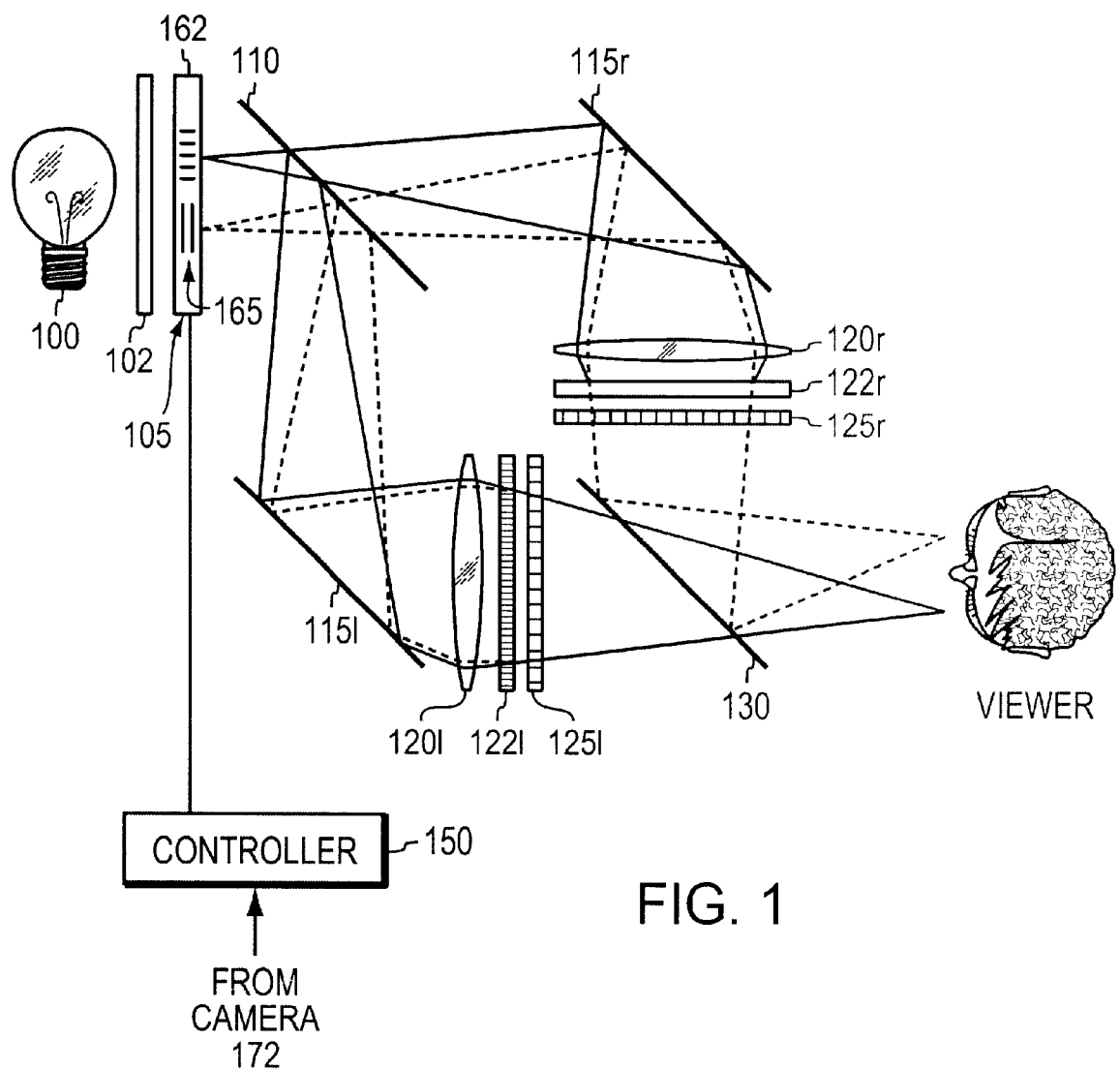
FIG. 1 is a schematic plan showing an implementation of the first embodiment of the invention.

With reference to FIG. 1, an implementation of the first embodiment of the invention comprises a light source 100, a diffuser 1 02, and a viewer-tracking polarizer 105 (the operation of which is described in greater detail below). Light exiting from viewer-tracking polarizer 105 encounters a beamsplitter 110 that directs the light toward a pair of fold mirrors 115*r*, 115*l*. Light reflected by mirror 115*r* may pass through a focusing lens 120*r* (which, if employed, may be biconvex as shown), a polarizer 122*r* oriented in a first polarization direction, and a first image LCD 125*r* that is illuminated by the light passing through it. The light from image LCD 125r strikes and is reflected from a second beamsplitter 130 toward the viewer.

Analogously, light reflected by mirror 115l passes through a second focusing lens 120l, a second polarizer 122l oriented in a second polarization direction orthogonal to the first polarization direction, and a second image LCD 125l. The light from image LCD 125l passes through beamsplitter 130 toward the viewer. In operation, image LCD 125r displays a right-eye stereoimage, while image LCD 125l displays a left-eye stereoimage.

Viewer-tracking polarizer 105 creates a tracking output image having a region of light polarized in the first direction and a region of light polarized in the second direction; it is these regions that are differentially focused to laterally separated viewing zones. A representative viewer-tracking polarizer is shown in FIG. 2. The operation of this device is best understood with reference to conventional LCD displays. Such a display ordinarily comprises a thin layer of liquid crystal material sandwiched between two glass plates, each of which has an electrical conducting layer deposited thereon. When the inside surfaces of the glass plates have been properly treated, the molecules of the liquid crystal material are forced to align so as to rotate helically from one glass plate to the other. Light passing through this sandwich is forced to rotate its polarization in accordance with the rotated conformation of the liquid crystal molecules, this degree of rotation often being 90°. When a voltage of sufficient magnitude is applied between the two glass plates, however, the liquid crystal molecules no longer form a rotational path from one plate to the other, and the polarization of light passing through the material is therefore unaffected. The liquid crystal material is selectably addressable (e.g., through arrangement in a pattern of cells or "pixels," which create the resolution of the display) so that the molecules can be electrically stimulated or left unstimulated in accordance with a desired pattern; as a result, the polarization of light passing through the liquid crystal material is altered or left unaffected in accordance with that pattern.

In many conventional LCDs used for display purposes, the sandwiched liquid crystal material is placed between two crossed polarizers. The first polarizer preconditions the light so that only one polarization passes through the liquid crystal sandwich. When the polarized light passes through a pixel across which no voltage is applied (an "off" pixel), the polarization of the light rotates 90° and, as a result, exits through the final polarizer. Light passing through an activated (or "on") pixel, however, is not altered in polarization and is therefore absorbed by the final polarizer. The LCD acts as a restrictive light valve with respect to a source of illumination on either side of the LCD, selectively passing or blocking the light in accordance with the pixel pattern.

Figure 2A:
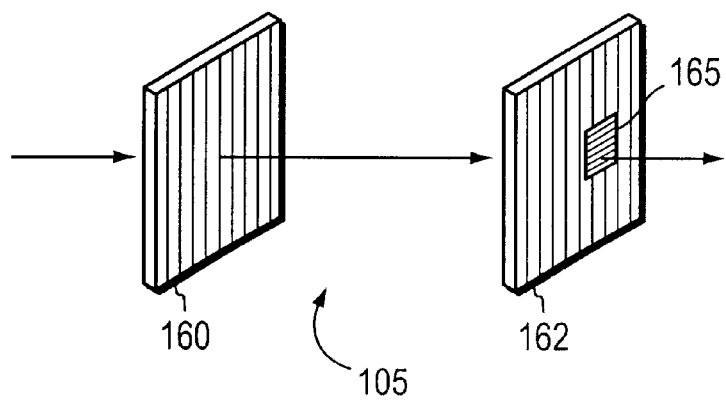
FIG. 2A is an exploded isometric view of a viewer-tracking polarizer in accordance with the invention.

With reference to FIG. 2A, viewer-tracking polarizer 105 may comprise a plane polarizer 160 and an addressable liquid crystal sandwich element 162. Polarizer 160 allows only one polarization component of incoming light to pass through; in the figure, plate 160 is configured to pass vertically polarized light. A controller 150 (see FIG. 1), which receives position data from a viewer-tracking system as described below, controls the pixels of liquid crystal element 162. As shown in FIG. 2A, element 162 may be operated by controller 150 such that the polarization of light passing through a small rectanglar region 165 rotates by 90° the light passing therethrough, while the polarization of light passing through the remainder of element 162 is unaffected. Light source 100 and diffuser 102 are located behind polarizer 160, so that polarizer 160 preconditions the light before it reaches element 162. Exiting element 162, therefore, is a light image having separate regions of crossed polarizations.

Due to the optical geometry of the arrangement shown in FIG. 1, the position of rectangle 165 within the area of element 162 determines where that rectangle 165 will be focused within a view zone. Accordingly, the rectangle of light whose polarization has been rotated may be directed to any desired point within the view zone merely by choosing its position on element 162.

Viewer-tracking polarizer 105 works in conjunction with polarizers 125r, 125l to direct each of the stereoimages to the proper eye of the viewer. Suppose, for example, that rectangular region 165 is horizontally polarized as shown while the remainder of the light passing through element 105 is vertically polarized; that polarizer 122r passes only the horizontally polarized component of incoming light; and that polarizer 122l passes only the vertically polarized component of incoming light. As a result of these assumptions, polarizer 122r is aligned with the "off" pixels of rectangle 165, while polarizer 122l is aligned with the "on" pixels outside rectangle 165.

Therefore, although light emanating from the entire face of viewer-tracking polarizer 105 passes through beamsplitter 110 and reaches polarizer 122r, only the light from rectangle 165 actually passes through polarizer 122r to illuminate display 125r; and because rectangle 165 has been positioned so that its image reaches the viewer's right eye via beamsplitter 130, the stereoimage from display 125r (which is illuminated by light from rectangle 165) also reaches the viewer's right eye. Similarly, only the light emanating from regions other than rectangle 165 can pass through polarizer 122l. This light passes through beamsplitter 130 to reach a view zone that includes the viewer's left eye but not his right eye, so the viewer's left eye perceives the stereoimage from display 125l.

This arrangement can accommodate multiple viewers. When a new viewer enters the view zone, controller 150 creates another polarization-altering rectangle within viewer-tracking polarizer 105 and positions this to follow the new viewer's right eye. Additional viewers can be accommodated so long as the rectangles do not occupy an excessive amount of the area of element 162.

Figure 2B:
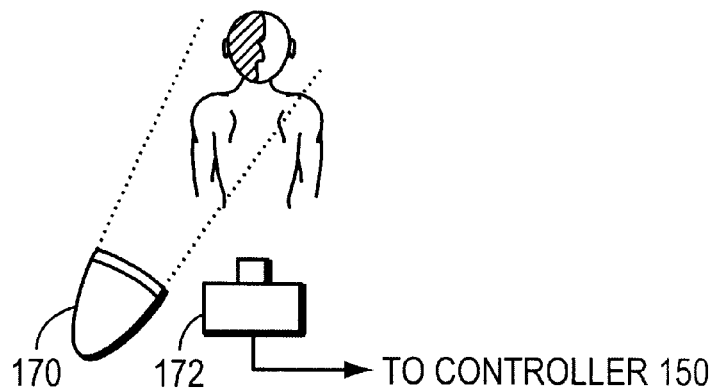
FIG. 2B schematically depicts a preferred tracking system.
Figure 2C:
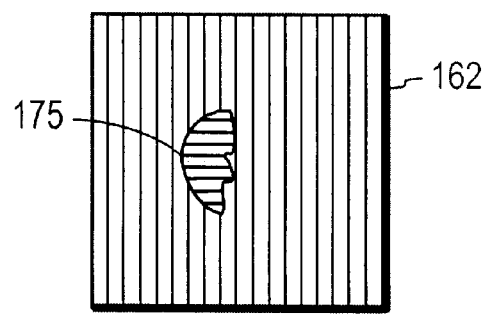
FIG. 2C, illustrates operation of the viewer-tracking polarizer shown in FIG. 2A in accordance with the output of the tracking system shown in FIG. 2B.

Refer now to FIG. 2B, which illustrates a tracking system useful in conjunction with this embodiment of the invention. A source 170 of non-visible (e.g., infrared (IR), ultraviolet (UV), etc.) radiation is aimed at the viewer so that, when the viewer is within the view zone (i.e., the physical boundaries within which the invention can operate), source 170 illuminates one side of his face. A camera 172 that is sensitive only to the non-visible radiation is positioned in front of the display so as to monitor the entire view zone (for example, if source 170 emits IR radiation, camera 172 may be fitted with an IR bandpass filter). The output of camera 172, then, is a facial image fragment corresponding to one side of the viewer's face (and including, most critically, one of the viewer's eyes). The output of camera 172 is provided to controller 150. The controller is programmable and is provided with the camera and viewing geometry. Based on the location of the facial image fragment within the camera field and the known camera and viewing geometry, controller 150 is able to straightforwardly create a pixel pattern 175 on element 162 (see FIG. 2C) conforming to the facial image fragment, and to position pattern 175 such that light passing through the pixels will be directed back onto the actual viewer's face to overlie the region illuminated by source 170.

Figure 3:
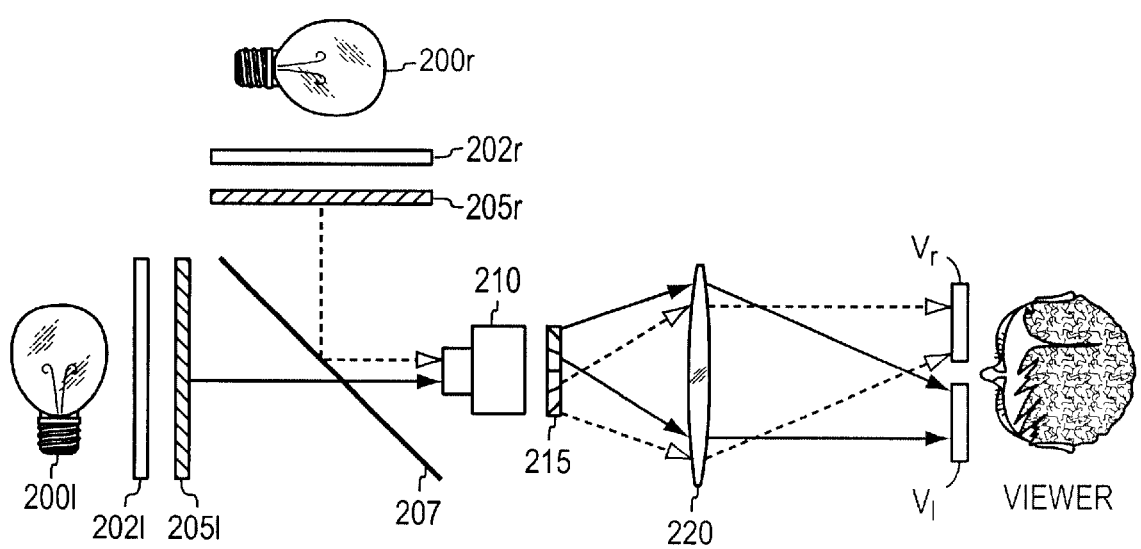
FIG. 3 is a schematic plan showing an implementation of the second embodiment of the invention.

Like all "through-the-beamsplitter" approaches-meaning that the image must be viewed through an output beamsplitter-the foregoing embodiment produces images that appear removed from the viewer and inaccessible. The second embodiment utilizes polarization to segregate stereoscopic images for presentation on a display screen rather than through a beamsplitter. An implementation of this embodiment, illustrated in FIG. 3, comprises a pair of light sources 200r, 200l; a pair of diffusers 202r, 202l; and a pair of image LCDs 205r, 205l. Image LCDs 205r, 205l each display one image of a stereopair (LCD 205r displaying the right-eye image and LCD 205l displaying the left-eye image). The So output polarizers of image LCDs 205r, 205l are oriented in orthogonal directions.

Light from the image LCDs 205r, 205l is combined by a beamsplitter 207 that directs the light toward a projection lens or lens assembly 210. Lens 210 projects the composite image through a viewer-tracking polarizer 215 onto a display element 220, which presents a viewable image to the viewer. A controller (not shown) analogous to controller 150 discussed in connection with the first embodiment controls viewer-tracking polarizer 215; this controller may receive tracking information from a viewer-locating system in accordance with the first embodiment. Viewer-tracking polarizer 215 is similar in construction to viewer-tracking polarizer 105, except that the liquid crystal element 162 (rather than polarizer element 160) faces the light source—i.e., projection lens 210.

Suppose, for purposes of example, that light exiting from image LCDs 205r, 205l is polarized vertically or horizontally, with the output polarizer of LCD 205r oriented so that light exiting this LCD is polarized vertically, while light exiting LCD 205l is polarized horizontally. Suppose, further, that the output polarizer of viewer-tracking polarizer 215 is oriented horizontally. In this configuration, light exiting LCD 205l can pass through viewer-tracking polarizer 215 only where are its pixels are "on"—that is, where the polarization of incoming light is unrotated, since the output polarizers of LCD 205l and viewer-tracking polarizer 215 are both horizontally oriented. Conversely, light exiting LCD 205r can pass through viewer-T) tracking polarizer 215 only where its pixels are "off" and therefore rotate light 90° in polarization.

Separate view zones $V_r$, $V_l$ can thus be formed through display element 220, which acts as a lens. The controller uses information from the tracking system to define an "on" area of viewer-tracking polarizer 215 conforming to the left side of the viewer's face (continuing the exemplary convention established above) and whose size and position, given the optics and geometry of display element 220 and the position of the viewer, focuses light from projection lens 210 onto the left side of the viewer's face—i.e., into viewing zone $V_l$. Since only light originating with image LCD 205l can pass through this "on" area of viewer-tracking polarizer 215, only the left stereoimage reaches the viewer's left eye. Analogously, light originating with image LCD 205r is directed toward the viewer's right eye. And once again, the system can accommodate multiple viewers by locating and tracking them, and defining appropriate "on" areas of viewer-tracking polarizer 215.

It should also be emphasized that this design does not require LCD displays. Instead, virtually any form of display (television, rear-projected images, etc.) can be used in conjunction with an appropriate polarizer disposed between the display and beamsplitter 207. Vivid moving images can readily be transmitted to image sources 205r, 205l using current broadcast technologies: by linking together two television channels, by compressing the information for the two images into a single television channel, or by using digital HDTV channels to deliver the two images over a single channel. This embodiment is also backward-compatible with standard (two-dimensional) television, allowing viewers to watch traditional television images and programs.

Display element 220 may be as simple as a focusing lens or, more realistically, a large fresnel lens. In these cases, the angular size of the total viewing zone as seen from the display will be the same as the angular size of the viewer-tracking polarizer 215. Increasing the size of the view zones requires proportionate increase in the size of projection lens 210 and viewer-tracking polarizer 215 (with consequent increases in cost, complexity and overall equipment size).

A display device was therefore designed to increase the viewing angle without increasing the size of either projection lens 210 or viewer-tracking polarizer 215. This display device, illustrated in FIG. 4, serves as an angle multiplier for light projected thereon, taking rays impinging at a small angle and widening the angle for the view zones. The display device comprises a Galilean telescope arrangement 250 disposed between two lenses 252, 254 of positive focal length. Galilean telescope 250 includes lens 257 having a positive focal length and a lens 260 having a negative focal length, lenses 257 and 260 being spaced apart such that they share a common focal point. In this manner, telescope arrangement 250 serves as an angle multiplier for light passing between the two outside lenses 252, 254. Lens 252 collimates the light exiting viewer-tracking polarizer 215, telescope arrangement 250 magnifies the ray angles of this collimated light, and lens 254 focuses the light to a magnified image of viewer-tracking polarizer 215 at the proper viewing distance, which corresponds to the front focal point of lens 254. Light rays entering the display at an angle a exit the display at an angle β.

Figure 4:
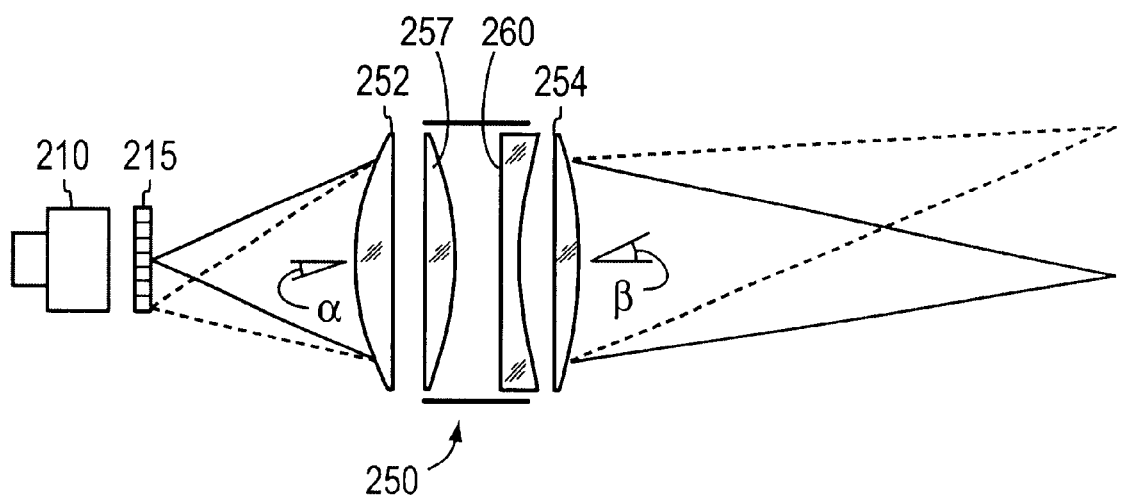
FIG. 4 is a schematic plan of an angle-widening display system.
Figure 5:
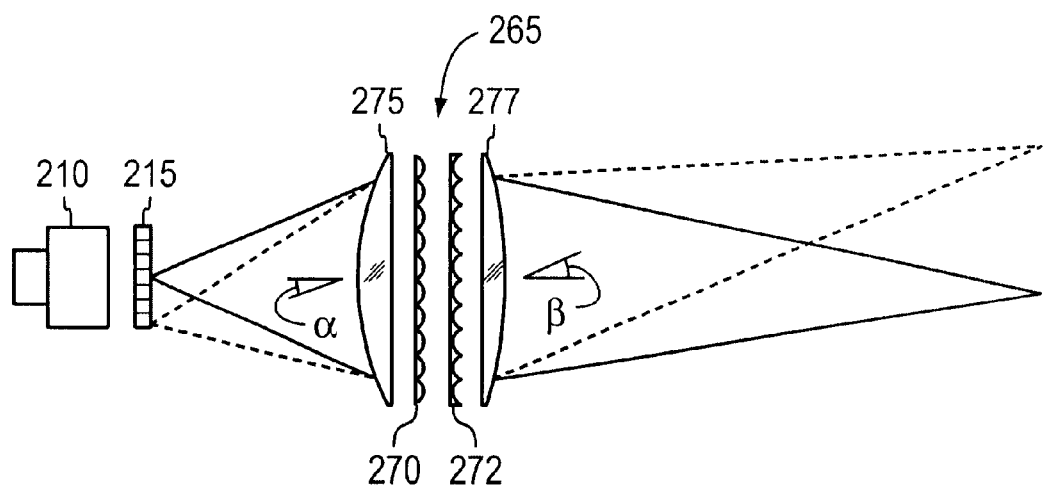
FIG. 5 is a schematic plan of a compact version of the optical arrangement illustrated in FIG. 4.

This optical arrangement, while suited to the purpose described, would nonetheless be bulky if implemented with the standard optical elements illustrated in FIG. 4. Accordingly, a compact version of the arrangement was designed. This screen system, indicated generally at 265 in FIG. 5, utilizes a pair of cylindrical lenslet arrays 270, 272. The elements of array 270 have positive focal lengths, while the elements of array 272 have negative focal lengths. These microlens arrays are sandwiched between two outer lenses, which may be fresnel lenses for compactness. Lens 275 collimates light exiting viewer-tracking polarizer 215, which is placed at the focal point of lens 275. The collimated light encounters lenslet arrays 270, 272, which act as a multiplicity of Galilean telescopes. The light passing through a positive lenticule of array 270 forms an image of viewer-tracking polarizer 215 a short distance beyond the facing negative lenticule of array 272. This negative lenticule recollimates the light before it becomes an actual image. Output lens 277 receives the collimated light leaving all of the negative lenticules of array 272 and forms at its focal point a single image of viewer-tracking polarizer 215. The proper viewing distance, then, is at the plane of this image (which is one focal length away from lens 277).

The magnification achieved with system 265 can be considered in two parts, namely, the fresnel lens magnification of lenses 275, 277 and the lenticular magnification of lenslet arrays 270, 272. The angular magnification of light passing through system 265 is determined solely by the lenticular magnification, while the size magnification of the view zone with respect to the size of viewer-tracking polarizer 215 is determined by a combination of the lenticular and fresnel lens magnifications.

The magnification arising from lenticular arrays 270, 272 is given by the ratio of the focal lengths of the positive and negative lenslets:

$$m_{lenticular} = \frac{f_{positive}}{f_{negative}}$$

The magnification due to input fresnel lens 275 and output fresnel lens 277 is similarly given by a ratio of focal lengths:

$$m_{fresnel} = \frac{f_{output\ fresnel}}{f_{input\ fresnel}}$$

The total size magnification of the system 265 is found by multiplying these equations:

$$m_{size} = (m_{fresnel})(m_{lenticular})$$

while the angular magnification $m_{angle}$ is the same as the lenticular magnification $m_{lenticular}$.

Figure 6:
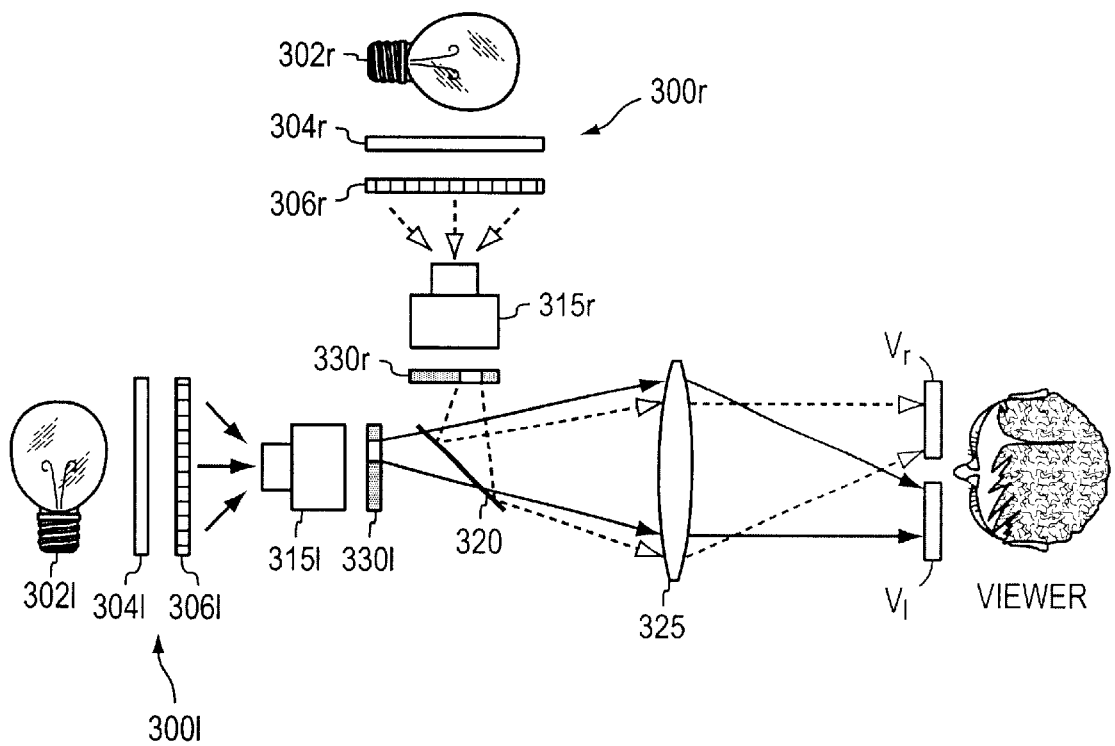
FIG. 6 is a schematic plan showing an implementation of the third embodiment of the invention.

A third embodiment of the invention, illustrated in FIG. 6, utilizes left and right image sources that do not require polarization. Rather than utilizing a single projection lens and viewer-tracking polarizer for both image sources, in this embodiment each image source has its own projection lens and viewer-tracking element, the latter not based on polarization.

In the illustrated implementation, each image source 300r, 300l comprises a light source 302r, 302l; a diffuser 304r, 304l; and an image LCD 306r, 306l (although, once again, this embodiment is least restrictive in terms of the nature of the image sources, which can be any form of display). The stereopair images from sources 300r, 300l are received by a pair of projection lens or lens arrangements 315r, 315l, which are directed toward different sides of an angled beamsplitter 320. The combined image from beamsplitter 320—that is, the light from lens 315l passing through the beamsplitter and the light from lens 315r reflected from it—is directed onto a viewable display element 325. The display element 325 may once again be as simple as a focusing lens, but is preferably the lenticular arrangement illustrated in FIG. 5.

Intervening between projection lenses 315r, 315l and beamsplitter 320 are a pair of viewer-tracking intensity modulators 330r, 330l. Rather than creating regions of different polarizations, as in the second embodiment, viewer-tracking intensity modulators 330r, 330l instead selectively pass or restrict light from image sources 300r, 300l. Thus, the intensity modulators may be conventional liquid crystal displays, with "off" pixels passing light and "on" pixels blocking light. A controller (not shown) analogous to controller 150 discussed in connection with the first embodiment controls both intensity modulators 330r, 330l; this controller may receive tracking information from a viewer-locating system in accordance with the first embodiment.

In operation, the controller creates a light-passing window in each intensity modulator, the position of each window being such that light passing through it is directed, through display 325, onto the appropriate viewing zone $V_l$, $V_r$. For example, the tracking system discussed above may be used to form an image of one side of the viewer's face (e.g., as shown in FIG. 2B, the right side), with the window in intensity modulator 330r shaped to conform to this image and positioned appropriately within the LCD display, and intensity modulator 330l assuming the inverse pattern (that is, passing light everywhere except through a region in the shape of the window in intensity modulator 330r, so that light from projection lens 315l is excluded only from the region containing the viewer's right eye).

Alternatively, the tracking system can be configured to keep track of the locations of both of the viewer's eyes, with the controller positioning windows in intensity modulators 330r, 330l in accordance with these locations. In one approach, the tracking system discussed in connection with the first embodiment is retained, but the controller is programmed to approximate the location of the viewer's unilluminated eye based on the pattern of illumination and typical face To sizes. That is, for most viewers, a tracked location of one eye suggests the location of the other eye with an acceptable degree of precision. The observed image of one eye (or side of the viewer's face) and the computed complementary image are used to define the windows in intensity modulators 330r, 330l.

In another approach, two separate illumination systems may be used in the manner proposed by Hattori et al. With renewed reference to FIG. 2B, a second source of illumination is directed toward the viewer from the opposite side so as to illuminate the other side of his face (i.e., the side not illuminated by source 170). Each of the sources emits non-visible light of a different wavelength, and a pair of cameras (of known locations and optical geometries) each equipped with a bandpass filter is focused on the viewer. One of the bandpass filters is tuned to the wavelength emitted by source 170, so this camera provides controller 150 with an image of the right side of the viewer's face; and the other bandpass filter is tuned to the wavelength emitted by the other source, the associated camera providing controller 150 with an image of the left side of the viewer's face. These left-side and right-side images are used to control the intensity modulators 330r, 330l.

The foregoing embodiments require separate image displays, one for the left-eye image and one for the right-eye image. The fourth embodiment of the invention utilizes a single display that presents alternating left-eye and right-eye images in rapid succession, directing each stereoimage to the proper eye and presenting the images with sufficient rapidity to confer the illusion of a unified image.

Figure 7:
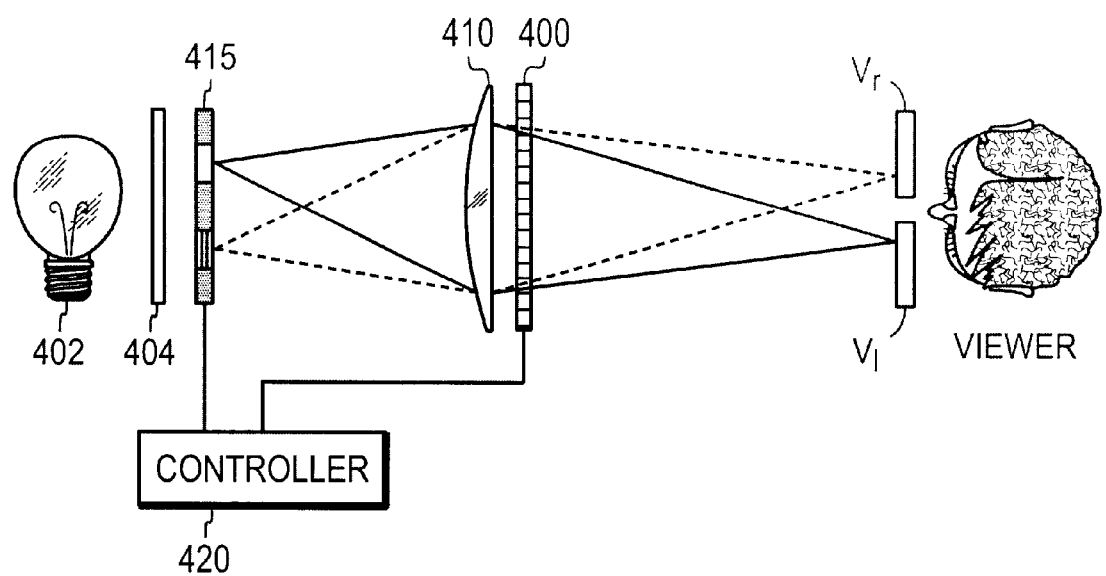
FIGS. 7 and 8 are schematic plans showing alternative implementations of the fourth embodiment of the invention.

In a first implementation of this embodiment, illustrated in FIG. 7, images are presented by a single LCD 400, which is illuminated by a light source 402 situated behind a diffuser 404. Intervening between the light source and LCD 400 are a lens 410 and an LCD 415 that acts as an intensity-modulating light valve. LCD 415 is operated by a controller 420 and a viewer-tracking system (not shown); the tracking system may be one that defines separate locations for each of the viewer's eyes, as discussed above in connection with the third embodiment of the invention, or controller 420 is programmed to use the actual location of one of the viewer's eyes to approximate the location of the other eye.

Controller 420 also determines the image appearing on LCD 400. Thus, controller 420 may be a programmable computer equipped for computation and control of LCD image displays. In operation, controller 420 computes the proper size and location on LCD 415 of two light-passing windows, each of which is displayed separately as determined by controller 420. A left-eye window passes light emanating from diffuser 404 such that, given the location of the viewer and the optical geometry of lens 410, the light is focused over the viewer's left eye (i.e., in view zone $V_l$). Analogously, light passing through a right-eye window appears in view zone $V_r$. The left-eye and right-eye windows may simply be inverse patterns; that is, a first window passes light directed onto one of the viewer's eyes and blocks light directed everywhere else, while the other window passes light directed everywhere except where directed through the first window. Controller 420 alternates the stereoimage appearing on LCD 400 in synchrony with the window it defines on LCD 415. Thus, for example, when the left image of a stereopair is displayed on LCD 400, the left-eye window is defined on LCD 415 (with the remainder of LCD 415 blocking light).

The image that controller 420 places on LCD 400 may originate from any number of sources. For example, controller 420 may acquire stereoimages from a permanent storage device, such as a hard disk or CD-ROM drive; as streamed data from a computer network or the Internet; or from a television broadcaster over one or two communication channels. A single still, three-dimensional image may be maintained by persistent alternating presentation of its two stereoscopic image components; or a moving image may be presented by successively displaying each stereoscopic component of each successive image frame with sufficient rapidity to convey the illusion of motion.

Naturally, this embodiment of the invention requires adequate display refresh rates to avoid the appearance of flickering. Ordinarily, an image LCD displaying a single channel of information must be updated at about 60 Hz to provide an image free of flicker. Because LCD 400 must handle two channels of information—that is, successive display of both stereoscopic components of each image frame—refresh rates of at least 120 Hz are desirable. It should also be noted that, because a single display alternates between images rather than displaying one of two images simultaneously, the illumination power of LCD 400 must be greater than that required of displays in the previously described embodiments.

Figure 8:
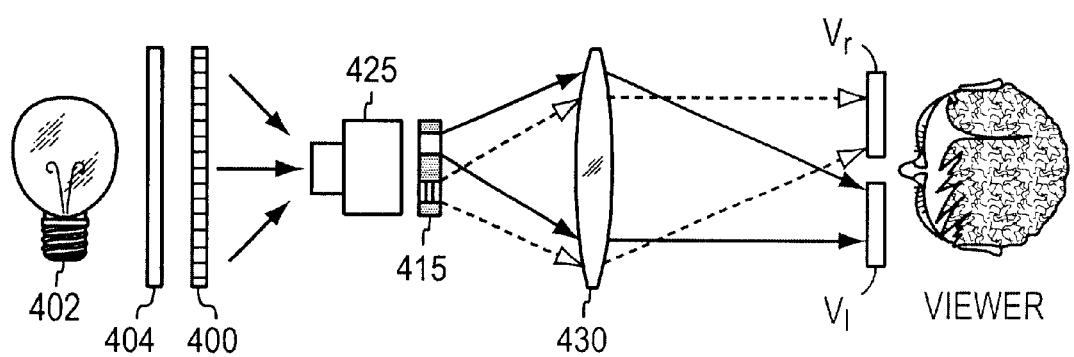

A second implementation of the fourth embodiment, illustrated in FIG. 8, utilizes projection rather than direct display of an LCD image, thereby allowing for practical display of larger images. In this case, light emanating from diffuser 404 is directed through a projection lens or lens system 425. Light exiting lens 425 passes through intensity-modulating LCD 415 before striking display 430 (which, yet again, may be as simple as a focusing lens but is preferably the lenticular arrangement illustrated in FIG. 5). The windows defined by controller 420 (see FIG. 7) alternately direct light through display 430 to one or the other of the viewer's eyes. Once again, the controller alternates the stereoimage appearing on LCD 400 in synchrony with the window it defines on LCD 415.

Both implementations of the fourth embodiment are capable of accommodating multiple viewers by creating additional windows within LCD 415.

It will therefore be seen that the foregoing approaches to stereoscopic image display are straightforwardly implemented, providing highly realistic images without the need for the viewer to wear special equipment or to remain motionless at a designated location. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, as noted earlier, it is not necessary to use light valves based on LCDs that selectively pass a pattern illumination from behind; instead, the pattern of illumination can be directly generated by an imaging element.

What is claimed is:

1. Apparatus for presenting a plurality of images, the apparatus comprising:
   a. means for establishing a moving target zone for a selected image, the image being visible within the target zone;
   b. means for generating a tracking output image, the output image comprising a first region of light polarized in a first polarization direction and substantially correlated to the target zone, and a second region of light spatially distinct from the first region and polarized in a second polarization direction distinct from the first polarization direction, the generating means optically moving the first region of light relative to the second region of light so as to maintain the correlation to the target zone;
   c. at least first and second image sources, each image source producing a different image;
   d. means for directing the tracking output image through each of the image sources so as to illuminate the image sources with the light from the tracking output image, the first region of light being focused onto the target zone through the first image source; and
   e. first and second polarizers interposed between the tracking output image and each of the first and second image sources, respectively, the first polarizer being oriented in the first polarization direction and the second polarizer being oriented in the second polarization direction, thereby presenting illumination from the first image source to the target zone and illumination from the second image source outside the target zone.

2. The apparatus of claim 1 wherein:
   a. the means for establishing a target zone comprises viewer-locating means for acquiring a facial image fragment of a viewer, the facial image fragment including a first one of the viewer's eyes;
   b. the first region of light is correlated to the facial image fragment;
   c. the first and second image sources produce complementary stereoimages; and
   d. the means for directing the tracking output image causes the first region of light to be focused onto a corresponding portion of the viewer's face through the first image source, such that illumination from the first image source is presented to the first eye of the viewer and illumination from the second image source to the other eye of the viewer.

3. The apparatus of claim 1 wherein the means for generating a tracking output image comprises:
   a. an illumination source; and
   b. a display comprising a polarizer to pre-condition light into a single polarization direction and a polarization-altering medium, the medium altering the polarization of light between first and second polarization directions in response to an externally applied stimulus, the medium being arranged in a pattern of cells each addressably responsive to the stimulus, the polarizer intervening between the illumination source and the polarization-altering medium.

4. The apparatus of claim 2 wherein the means for directing the tracking output image comprises:
   a. first and second mirrors;
   b. a first beamsplitter for directing the tracking output image to each of the mirrors;
   c. first and second focusing lenses associated with each of the image sources; and d. a second beamsplitter for combining output from each of the image sources, wherein the mirrors and the focusing lenses are oriented so as to project the tracking output image through each of the image sources in a manner focusing the facial image fragment onto a corresponding portion of the viewer's face through the first image source.

5. Apparatus for presenting a plurality of images, the apparatus comprising:

a. means for establishing a target zone for a selected image, the image being visible within the target zone;

b. at least first and second image sources, the first and second image sources producing first and second images, respectively;

c. means for polarizing the first and second images in first and second distinct polarization directions, respectively;

d. means for combining the images into a composite image;

e. means for projecting the composite image;

f. a display screen for viewably receiving the projected image; and g. means for optically separating the first and second images from the projected composite image and controlling their display such that (i) the target zone receives light only from a selected one of the first and second images, (ii) regions outside the target zone receive light from the other of the first and second images, and (iii) the first and second polarized images are movable relative to each other.

6. The apparatus of claim 5 wherein the means for separating the first and second images comprises:

a. means for generating a tracking polarization pattern having a first region substantially correlated to the target zone and a second region separate from the first region, one of the first and second regions rotating incident light in a first polarization direction, the other region rotating incident light in a second polarization direction distinct from the first polarization direction;

b. means for directing the projected composite image onto the tracking polarization pattern, thereby altering the polarization of the composite image in accordance with the pattern, a portion of the composite image passing through the first region, said portion reaching the target zone; and c. means disposed between the tracking polarization pattern and the display screen for absorbing light such that the target zone receives light only from the first image and areas outside the target zone receive light only from the second image.

7. The apparatus of claim 5 wherein:

a. the means for establishing a target zone comprises viewer-locating means for acquiring a facial image fragment of a viewer, the facial image fragment including a first one of the viewer's eyes;

b. the first and second image sources produce first and second complementary stereoimages; and c. the means for separating the first and second images from the projected composite image controls their display such that the viewer's first eye receives light only from the first stereoimage and the viewer's second eye receives light only from the second stereoimage.

8. The apparatus of claim 7 wherein the means for separating the first and second images comprises:

a. means for generating a tracking polarization pattern having a first region substantially correlated to the facial image fragment and a second region separate from the first region, one of the first and second regions rotating incident light in a first polarization direction, the other region rotating incident light in a second polarization direction distinct from the first polarization direction;

b. means for directing the projected composite image onto the tracking polarization pattern, thereby altering the polarization of the composite image in accordance with the pattern, a portion of the composite image passing through the first region, said portion reaching a corresponding portion of the viewer's face via the display screen so that light rotated in the first polarization direction is directed toward one of the viewer's eyes and light rotated in the second polarization direction is directed toward the other of the viewer's eyes; and c. means disposed between the tracking polarization pattern and the display screen for absorbing light such that the viewer's first eye receives light only from the first stereoimage and the viewer's second eye receives light only from the second stereoimage.

9. The apparatus of claim 5 wherein each of the first and second images comprise light components oriented in the first and second polarization directions, the means for polarizing the first and second stereoimages comprising:

a. means for transmitting only the component of the first image oriented in one of the first and second polarization directions; and b. means for transmitting only the component of the second image oriented in the other of the first and second polarization directions.

10. The apparatus of claim 6 wherein the means for generating a tracking polarization pattern comprises a polarization-altering medium, the medium rotating the polarization of incident light in a first polarization orientation in response to a first externally applied stimulus and in a second polarization orientation in response to a second externally applied stimulus, the medium also being arranged in a pattern of cells each addressably responsive to the stimuli, the means disposed between the tracking polarization pattern and the display screen comprising a material polarized so as to absorb light polarized in one of the first and second directions.

11. The apparatus of claim 5 wherein the display screen comprises a lens system for directing toward the viewer's first eye light passing through the facial image fragment and directing toward the viewer's other eye light not passing through the facial image fragment.

12. The apparatus of claim 11 wherein the lens system comprises a fresnel lens.

13. The apparatus of claim 11 wherein the lens system comprises input and output lenses and an angle multiplier for light passing between the input and output lenses.

14. The apparatus of claim 13 wherein the angle multiplier comprises first and second cylindrical lenslet arrays disposed between the input and output lenses.

15. The apparatus of claim 14 wherein the first lenslet array comprises a plurality of elements having positive focal lengths and the second lenslet array comprises a plurality of elements having negative focal lengths.

16. The apparatus of claim 13 wherein the input and output lenses are fresnel lenses.

17. The apparatus of claim 7 wherein the viewer-locating means comprises illumination means positioned so as to be continuously directed at a facial image fragment of the viewer, the facial image fragment including a first one of the viewer's eyes but not the other of the viewer's eyes, notwithstanding movement of the viewer within a viewing area.

18. The apparatus of claim 17 wherein the illumination means emits non-visible radiation.

19. A method of presenting a plurality of images, the method comprising the steps of:
  a. establishing a target zone for a selected image, the image being visible within the target zone;
  b. providing first and second images;
  c. polarizing the first and second images in first and second polarization directions, respectively;
  d. combining the images into a composite image;
  e. projecting the composite image for display;
  f. providing first and second patterned polarization regions movable relative to each other; and
  g. using the first and second patterned polarization regions to optically separate the first and second images from the projected composite image and to control their display such that (i) the target zone receives light only from a selected one of the first and second images, and (ii) regions outside the target zone receive light from the other of the first and second images.

20. The method of claim 19 wherein:
  a. the target zone is a facial image fragment acquired from a viewer, the facial image fragment including a first one of the viewer's eyes;
  b. the first and second images are complementary stereoimages; and
  c. control of the display of the separated images causes the viewer's first eye to receive light only from the first stereoimage and the viewer's second eye to receive light only from the second stereoimage.

21. The method of claim 20 wherein the composite image has a polarization state and the first and second images are separated according to steps comprising:
  a. generating a tracking polarization pattern having a first region substantially correlating to the facial image fragment and a second region separate from the first region;
  b. altering the polarization of the composite image in accordance with the pattern by rotating the polarization state of a region of the composite image to a first polarization orientation corresponding to one of the first and second pattern regions and rotating the polarization state of the remainder of the composite image fragment to a second polarization orientation distinct from the first polarization orientation;
  c. directing the light of the first polarization orientation toward one of the viewer's eyes and the light of the second polarization direction toward the other of the viewer's eyes; and
  d. filtering light not polarized in one of the first and second orientations such that the viewer's first eye receives light only from the first stereoimage and the viewer's second eye receives light only from the second stereoimage.

22. The method of claim 20 wherein the facial image fragment is acquired by continuously illuminating a facial image fragment of the viewer notwithstanding movement of the viewer within a viewing area, the facial image fragment including a first one of the viewer's eyes but not the other of the viewer's eyes, and recording the illuminated fragment.

23. The method of claim 22 wherein the facial image fragment is illuminated by non-visible radiation.

24. Apparatus for presenting a plurality of images, the apparatus comprising:
  a. at least first and second image sources for projecting first and second images;
  b. means for combining light emanating from the image sources along a common optical axis;
  c. a plurality of light valves interposed between the image sources and the combining means, each light valve providing a controllably sized and positioned region of light;
  d. a display screen for viewably receiving the combined image; and
  e. means for controlling the light valves to place the images at desired, spatially distinct locations.

25. The apparatus of claim 24 wherein:
  a. the first and second image sources project left and right stereoimages; and
  b. the controlling means is configured to control the light valves in accordance with a position of a viewer such that the left stereoimage appears in a left view zone visible to the viewer's left eye and the right stereoimage appears in a right view zone visible to the viewer's right eye.

26. The apparatus of claim 24 wherein each light valve comprises a liquid crystal display having a pattern of cells addressably switchable between a transparent state and an opaque state.

27. The apparatus of claim 25 wherein the controlling means comprises:
  a. means for tracking the viewer; and
  b. means, responsive to the tracking means, for defining the region of light on each light valve.

28. Apparatus for presenting a plurality of image, the apparatus comprising:
  a. an image source;
  b. means for causing the image source to successively display first and second images;
  c. a light valve for providing a controllably sized and positioned region of light;
  d. means for controlling the light valve in accordance with a position of at least one viewer, the controlling means causing the light valve to alternatively define, in synchrony with display by the image source of the first and second images, first and second light regions, the light valve cooperating with the image source such that light provided by the first region causes the first image to appear in a first view zone, and light provided by the second region causes the second image to appear in a second view zone spatially distinct from the first view zone.

29. The apparatus of claim 28 wherein:
  a. the first and second images are left and right stereoimages, respectively;
  b. the first view zone is visible only to a viewer's left eye, and the second view zone is visible only to the viewer's right eye.

30. The apparatus of claim 28 further comprising a focusing system for passing light from the light valve through the image source so as to present an image to a viewer.

31. The apparatus of claim 29 further comprising:
  a. means for projecting the images onto a display screen; and
  b. a display screen for viewably receiving the images, the light valve being disposed between the image source and the display screen.

32. The apparatus of claim 31 wherein the display screen comprises a lens for directing toward the first view zone light provided by the first region and directing toward the second view zone light provided by the second region.

33. The apparatus of claim 28 wherein the image source is a liquid crystal display.

34. The apparatus of claim 29 wherein the controlling means comprises means for tracking a position of at least one of the viewer's eyes.

35. A polarization pattern generator capable of manipulating incident light having polarization components, the generator comprising:

a. a polarization-altering medium, the medium changing the polarization of the incident light in response to an externally applied stimulus, the medium also being arranged in a pattern of polarizable cells each addressably responsive to the stimulus; and b. a passive polarizer associated with the polarization-altering medium, a polarization pattern formed in the polarization-altering medium being movable relative to the passive polarizer.

* * * * *